United States Patent Office.

ELIZA D. MURFEY, OF NEW YORK, N. Y.

Letters Patent No. 108,286, dated October 11, 1870.

IMPROVEMENT IN MATERIALS FOR PACKING AND BEARINGS.

The Schedule referred to in these Letters Patent and making part of the same.

I, ELIZA D. MURFEY, of New York, county of New York, State of New York, have invented an improved Packing and Bearing Material, of which the following is a specification.

Nature and Object of the Invention.

My invention consists of felt impregnated with plumbago, soapstone, or equivalent substances, as described hereafter, (and condensed, if required,) to produce a substitute for the usual packing or bearing materials.

Packings and bearings consisting of mixtures of insoluble substances in a comminuted state, while they are sometimes efficient as long as they can be retained in contact with the bearing-surfaces in the packing-boxes or in the joints to be closed, are apt to become disintegrated and crumble away, even when fibrous substances are introduced into the composition to insure cohesion.

To remedy this defect I first combine the fibers by the process of felting, so as to form an extremely light loose mass or cloth, which I then impregnate with a suitable material or composition, (and compress, if necessary,) forming the packing or bearing desired.

The felt may be of any desired thickness, and the impregnating material may consist of powdered or comminuted plumbago, burnt hair, asbestos, or any other substance or composition which may be found efficient.

The comminuted insoluble substance or substances may be thoroughly combined with the felt by introducing the latter into a vessel containing a mixture of the said substance, and melted paraffine, or its equivalent, and subjecting the whole to excessive atmospheric pressure, the paraffine being afterward extracted by heat, or pressure, or both.

The impregnated felt may be employed in sheets for packing joints; it may be cut into blocks or ropes for use in stuffing boxes, or it may be condensed or molded under excessive pressure to form hard solid blocks for bearings, &c.

Inasmuch as the fibers are thoroughly united by the felting process before the application of the impregnating material, the packing or bearing will not become disintegrated under the influence of heat, pressure, or moisture, as those made in a different manner are apt to do.

I claim as a new manufacture—

1. A material for packing, &c., consisting of felt impregnated with comminuted substances or compositions, as described.

2. A material for bearings, &c., consisting of the said impregnated felt condensed under pressure.

In testimony whereof, I have signed my name to this specification in the presence of two subscribing witnesses.

E. D. MURFEY.

Witnesses:
THOMAS PRUDEN,
H. McMANUS.